US 12,507,988 B2

United States Patent
Warner et al.

(10) Patent No.: US 12,507,988 B2
(45) Date of Patent: Dec. 30, 2025

(54) TRANSDUCER FIXATION APPARATUS

(71) Applicant: OREGON HEALTH & SCIENCE UNIVERSITY, Portland, OR (US)

(72) Inventors: David Warner, Portland, OR (US); Albert Lwin, Portland, OR (US); Luis Elenes, Terrebonne, OR (US); Scott Witt, Glendale, CA (US)

(73) Assignee: Oregon Health & Science University, Portland, OR (US)

( * ) Notice: Subject to any disclaimer, the term of this patent is extended or adjusted under 35 U.S.C. 154(b) by 295 days.

(21) Appl. No.: 18/160,934

(22) Filed: Jan. 27, 2023

(65) Prior Publication Data

US 2023/0233179 A1    Jul. 27, 2023

Related U.S. Application Data

(60) Provisional application No. 63/303,947, filed on Jan. 27, 2022.

(51) Int. Cl.
  *A61B 8/00*  (2006.01)
  *A61B 8/06*  (2006.01)

(52) U.S. Cl.
  CPC .............. *A61B 8/4236* (2013.01); *A61B 8/06* (2013.01); *A61B 8/4455* (2013.01); *A61B 8/4483* (2013.01); *A61B 8/488* (2013.01)

(58) Field of Classification Search
  CPC ....... A61B 8/4236; A61B 8/06; A61B 8/4455; A61B 8/4483; A61B 8/488; A61B 8/565; A61B 8/4227; A61B 8/4444; A61B 8/4209; A61B 8/4281
  See application file for complete search history.

(56) References Cited

U.S. PATENT DOCUMENTS

| | | | | |
|---|---|---|---|---|
| 5,161,413 A | * | 11/1992 | Junker | G01N 29/265 73/634 |
| 12,207,971 B2 | * | 1/2025 | Sakai | A61B 8/467 |
| 2007/0016030 A1 | * | 1/2007 | Stringer | A61B 8/4455 600/437 |
| 2008/0167556 A1 | * | 7/2008 | Thompson | A61N 7/00 600/439 |
| 2015/0018686 A1 | * | 1/2015 | Berard-Andersen | A61B 8/4444 428/355 R |

(Continued)

*Primary Examiner* — Sanjay Cattungal

(57) ABSTRACT

A transducer fixation apparatus is configured to position and secure to a skin surface of a patient a transducer to allow repeated or continuous monitoring of blood flow in a subsurface vessel. The transducer fixation apparatus includes a housing having a plurality of flexible attachment wings that attach and conform in shape to the skin surface using an adhesive material present on each of the wing undersides. In some embodiments the wings may be biased upward away from the skin surface to facilitate positioning of the fixation apparatus prior to skin attachment. Alternative embodiments include a detachable retainer clip to hold the wings away from the mounting surface during placement as well as an optional positioning wand to aid with placement. Other embodiments may include a separate flexible attachment wing configured to hold a gel pad for acoustic coupling to the skin surface, the separate flexible attachment wing intended to be joined to the housing of the transducer fixation apparatus prior to skin surface attachment.

26 Claims, 14 Drawing Sheets

(56) References Cited

U.S. PATENT DOCUMENTS

| | | | |
|---|---|---|---|
| 2017/0105700 A1* | 4/2017 | Bar-Zion | A61B 8/0891 |
| 2019/0083784 A1* | 3/2019 | Raghunathan | A61N 1/36 |
| 2021/0251599 A1* | 8/2021 | Torp | A61B 8/488 |
| 2022/0151586 A1* | 5/2022 | Torp | A61B 8/06 |
| 2024/0350085 A1* | 10/2024 | Ascher | A61B 5/6826 |
| 2025/0032174 A1* | 1/2025 | Zarins | A61B 8/12 |

* cited by examiner

TRANSDUCER FIXATION APPARATUS

COPYRIGHT NOTICE

@2023 Oregon Health & Science University. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71 (d)

TECHNICAL FIELD

This disclosure relates to a transducer fixation apparatus configured to facilitate precise positioning and fixation of a transducer to the skin surface of a patient to enable repeated and reproducible measurement of subsurface blood flow in an artery or vein.

BACKGROUND INFORMATION

Ultrasound transducers are often used in clinical settings to image vascular structures and characterize blood flow in patients. In Doppler ultrasound studies, in particular, ultrasound transducers utilize ultrasound energy in conjunction with signal processing techniques to measure the variation of velocity of blood flowing through a blood vessel and monitor changes in blood velocity over time. Doppler ultrasound data may be presented to the clinician in the form of a waveform tracing and as an audible signal, both of which can be used for interpretation of the physiology and function of the blood vessels being studied. The Doppler ultrasound transducer is used on a routine basis in the practice of vascular surgery as a bedside tool to evaluate pulsatile blood flow and vessel patency. For example, when a patient has undergone an operation to improve blood flow to an extremity such as a leg or foot, a Doppler ultrasound transducer is routinely used to monitor peripheral pulses.

Following a vascular operation, it is standard practice to immediately evaluate the blood flow in the affected region in order to monitor the patency of the vascular reconstruction. Traditionally, this entails evaluating the blood flow while still in the operating room using a handheld Doppler ultrasound probe, and marking the site of the strongest flow signal with a marking pen so that the same site may be located for follow-up measurements. It is not unusual for a patient to be sent to the intensive care unit (ICU) for monitoring of this flow signal on an hourly basis; sometimes, this is the only indication for ICU-level care. The collection of such repeated measurements by medical staff using a handheld probe can place a substantial strain on limited hospital resources and personnel. In addition, because follow-up measurements require that the site of strongest signal be re-identified during each session, longitudinal measurement errors may be introduced that complicate the comparison of blood flow signals acquired at different time points. Thus, there is a need for technologies that reduce staff burden and measurement errors inherent in serial monitoring of vessel patency and blood flow using handheld Doppler ultrasound probes and transducers.

SUMMARY OF THE DISCLOSURE

A transducer fixation apparatus is configured for measurement of blood flow within a blood vessel of a patient. The transducer fixation apparatus is configured in various embodiments to facilitate precise placement of a measurement transducer, such as a Doppler ultrasound transducer, on the skin surface at a location proximal to a subsurface vessel of interest so that a robust signal may be acquired at that same location during repeated follow-up measurements or as part of a continuous surveillance plan. Placement of the transducer includes initial user adjustment of the transducer position and orientation to establish an optimal location for signal acquisition followed by use of a non-permanent adhesive to securely fix the transducer to the identified site. The transducer fixation apparatus is particularly well-suited to monitoring blood flow in peripheral vessels of the extremities (e.g., vessels in the arms and hands, or in the legs and feet), but may also readily be affixed to the skin at other anatomical locations where measurement of blood flow and vessel patency are of interest.

The disclosed transducer fixation apparatus includes a transducer housing configured to receive a measurement transducer into a housing body so that the measurement transducer is constrained from motion within the transducer housing. The transducer housing includes an open bottom through which the measurement transducer may be introduced for secure placement into an interior compartment formed in the housing body. A plurality of flexible wings extend outwardly from the exterior of the housing body, each of the wings coated on its respective lower side with a layer of adhesive bonding material suitable for securing the transducer housing to a surface, such as a skin surface, so that the bottom periphery of the open bottom is in contact with said surface. In some embodiments, the wings may initially be biased so that their lower sides are elevated away from the surface upon which the bottom periphery of the transducer housing is set. This biasing of the flexible wings facilitates the translational and rotational positioning of the transducer fixation apparatus upon a measurement surface prior to non-permanent attachment of each the wings to the surface using the adhesive bonding material coating their lower sides.

In some embodiments, the transducer housing may be used in conjunction with an acoustic coupling material that spans the open bottom of the housing. This acoustic coupling material may comprise either, or both of, an acoustic gel pad and a volume of acoustic gel.

The transducer housing may also include, in certain embodiments, an opening on the exterior of the housing body to allow a set of signal wires to exit the interior compartment when a wired transducer, such as a wired ultrasound transducer, is housed within. In some embodiments, the transducer housing may further include an insert configured to slide into and partly obstruct the opening on the exterior of the housing body. Such an insert may provide support to signal wires exiting the opening and also provide continuity and closure to the bottom periphery of the transducer housing to mitigate evaporative fluid loss from the acoustic coupling material when the housing is adhered, for example, to the skin surface of a patient. In some embodiments, the insert may have its own wing extending outwardly with a layer of adhesive bonding material coating its lower side, and may also be biased as described above. In a particular embodiment, the insert may include a pair of retention arms configured to retain between them an acoustic gel pad sized to span the open bottom of the transducer housing.

In some embodiments the transducer fixation apparatus may further include a retainer clip component that can be removably attached to the transducer housing. The retainer clip may be configured with a plurality of support arms, each support arm spatially aligned with a corresponding one of the wings extending from the transducer housing. When the retainer clip is attached to the transducer housing, the support arms may be used to lift the distal ends of the wings away from the measurement surface, maintaining the length of the wings in a temporary curved conformation with the lower sides' adhesive bonding material lifted away from the surface to which the housing will be mounted. Holding the wings in such a lifted conformation aids the user in positioning the housing and transducer assembly in a location to optimize signal acquisition prior to adhesion to the surface. In some embodiments, the transducer fixation apparatus may also include a wand that may be attached to the transducer housing or the retainer clip, or to both, to facilitate positioning and deployment of the housing and transducer assembly onto the surface from which measurements are to be taken.

An aspect of the disclosed transducer fixation apparatus is that the transducer housing may be a disposable component to be used in conjunction with a non-disposable (i.e., reusable) measurement transducer. The transducer housing is configured with an open bottom to allow a measurement transducer to be removably inserted into its interior compartment prior to adhesion to a measurement surface such as a skin surface of a patient. The open bottom of the housing allows for transmission of signals, such as ultrasound waves, from the measurement transducer through an acoustic coupling material for incidence upon the target surface and reflection of signals back to the measurement transducer. Upon completion of a measurement study, the transducer housing and acoustic coupling material may be discarded and the measurement transducer cleaned and stored for future use.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
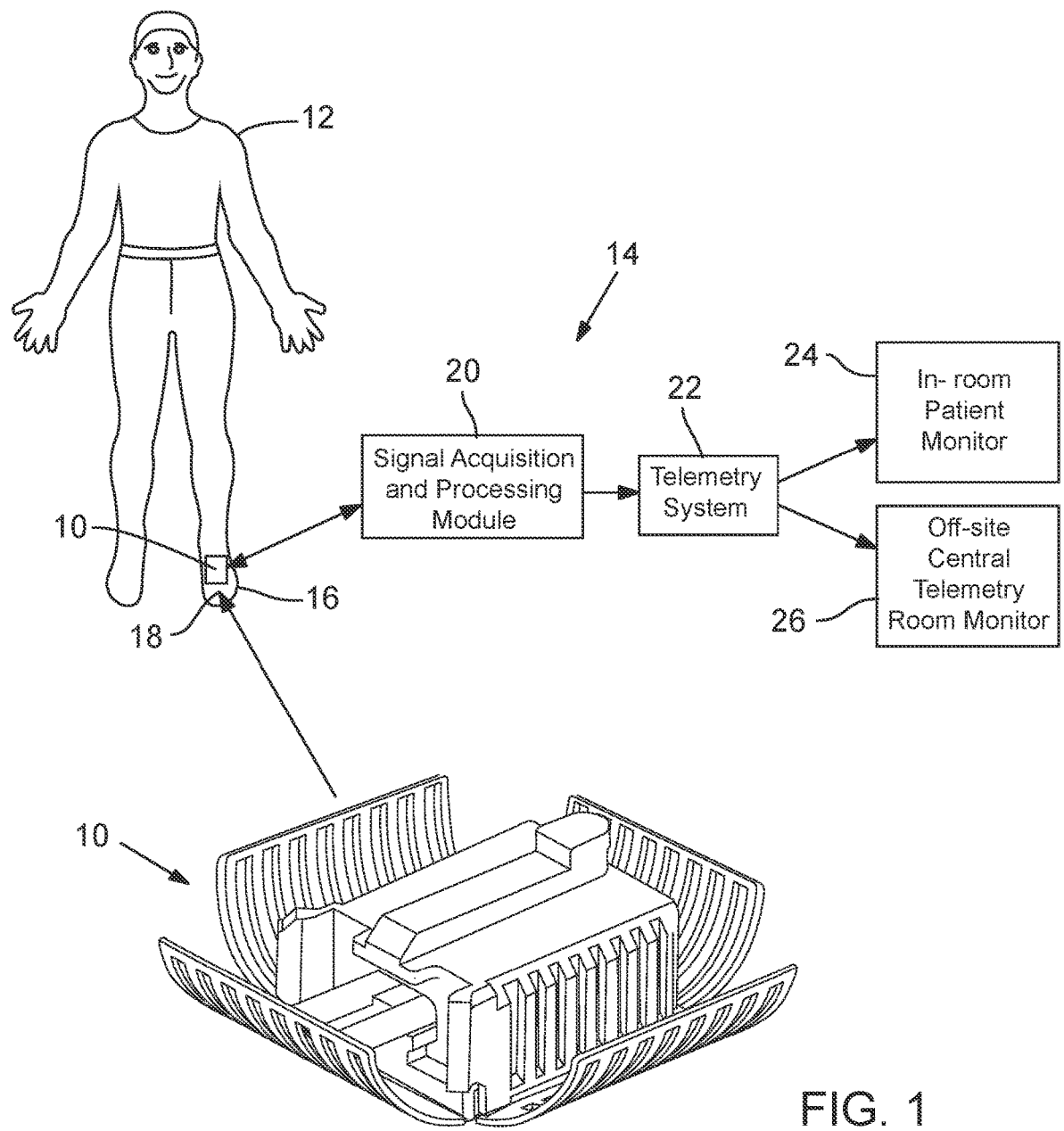
FIG. 1 is a schematic diagram presenting an overview of a remote patient observation platform in which an embodiment of the disclosed transducer fixation apparatus is utilized.

FIG. 1 shows a schematic overview of a disclosed transducer fixation apparatus 10 configured for repeated or continuous measurement of blood flow at a fixed location on a patient 12 and forming a part of a remote patient observation platform 14. This schematic is intended to provide a non-limiting context in which various embodiments of transducer fixation apparatus 10 might be used, with detailed descriptions of such various embodiments to be described below. As depicted in a particular use case in FIG. 1, disclosed embodiments of transducer fixation apparatus 10 may be non-permanently affixed to an extremity 16 of patient 12, such as the patient's foot as shown here. Transducer fixation apparatus 10 is intended to be affixed to an external surface, such as the skin, rather than be implanted, to measure subsurface blood flow in a blood vessel. Transducer fixation apparatus 10 is in operable communication with a signal acquisition and processing module 20 that controls the generation, transmission, acquisition, and processing of ultrasound signals used to interrogate blood flow at surface 18. Signal acquisition and processing module 20 may further be in operable communication with a telemetry system 22 to allow continuous monitoring of transducer fixation apparatus 10. Telemetry system 22 may be configured for wire-based or wireless communication with a patient monitor 24, typically located in close proximity to patient 12. Alternatively, or in addition, telemetry system 22 may be configured to wirelessly communicate signal data to a remote telemetry monitor 26 for off-site processing, display, storage, and review. It is also to be understood that while transducer fixation apparatus 10 is described herein in the context of continuous monitoring of blood flow, apparatus 10 may also be used to acquire intermittent or repeated measurements at serial time points. In some applications, for example, it may be desirable to acquire measurements based on a triggering event such as change in patient blood pressure, onset of pain reported by patient, or in response to a request sent through remote patient observation platform 14.

FIGS. 2A, 2B, 3A, and 3B show various views of a disclosed transducer fixation apparatus 10 configured in a first embodiment. Transducer fixation apparatus 10 includes a transducer housing 30 from which a plurality of flexible attachment wings 32 extend (three such flexible attachment wings shown in drawings of FIGS. 2A, 2B, 3A, and 3B). Each of wings 32 includes a layer of adhesive bonding material 34 on one side, i.e., the lower side, to secure transducer housing 30 to extremity surface 18 of patient 12. Transducer housing 30 includes an open bottom 36 that allows access into an interior compartment 38 that is sized to receive and enclose a transducer assembly 40. When transducer assembly 40 is enclosed within transducer housing 30 and flexible attachment wings 32 are secured to skin surface 18 of patient 12 by layer of adhesive material 34, transducer assembly 40 is compressed against and immobilized upon surface 18, thereby enabling continuous monitoring of blood flow at this fixed location on patient 12 and with the transducer assembly 40 maintained in a fixed orientation.

In a particular embodiment, transducer assembly 40 includes a Doppler ultrasound transducer 42 in combination with an acoustic gel pad 44 and a volume of acoustic gel 46 to facilitate transmission and reception of ultrasound signals to and from surface 18. An exemplary Doppler transducer having geometry similar to that shown in FIGS. 2A, 2B, 3A, and 3B and suitable for use in the application described herein is the Model 801-B with 15 degree flat probe available from Parks Medical Electronics, Inc. (Aloha, Oregon, USA). However, it is to be understood that transducers and sensors having different geometries and functionality may be utilized with transducer housing 30, wherein the specific geometric properties of housing 30 are accordingly modified to accommodate such different transduces and sensors, without departing from the scope of this disclosure. Doppler ultrasound transducer 42 includes a sensor body 48 with a mounting-side surface 50 through which a cavity 52 is formed. Cavity 52 includes within its interior an angled cavity surface 54 inclined at an acute orientation relative to planar mounting-side surface 50. Doppler ultrasound transducer 42 includes a set of transducer elements (not shown in drawings) that are disposed within cavity 52 upon angled cavity surface 54 and oriented to emit ultrasound signals for non-perpendicular incidence on surface 18 of patient 12 and receive reflected signals containing frequency shift information indicative of blood velocity in a subsurface vessel. Acoustic gel pad 44 is affixed or otherwise maintained in mechanical communication with mounting-side surface 50 of Doppler ultrasound transducer 42 during use, thereby providing an acoustic coupling medium between extremity surface 18 and Doppler ultrasound transducer 42. Cavity 52 may further be filled with volume of acoustic gel 46 to form a continuous interface between acoustic gel pad 44 and the set of transducer elements to facilitate transmission of ultrasound signals. In some embodiments, acoustic gel pad 44 may be formed into a shape that mates with and fills cavity 52 of Doppler ultrasound transducer 42 so that the need for acoustic gel 46 as a coupling medium is minimized or obviated. Doppler ultrasound transducer 42, in the embodiment depicted here, includes a set of signal wires 58 (two shown in FIGS. 2A, 2B, 3A, 3B) in operable communication with the set of transducer elements and extending from sensor body 48 to operably interface with signal acquisition module 20 that has capabilities such as signal generation, signal acquisition, signal processing, signal transmission, and signal storage. In alternate embodiments, transducer 42 may be configured without signal wires 58, and instead incorporate integrated hardware and power source for wireless communication functionality to operably interface with signal acquisition module 20.

Transducer housing 30 includes a housing body 59 having an exterior 60 with an optional side opening 62 into interior compartment 38. Side opening 62, when present, is contiguous with open bottom 36 and provides an exit for set of signal wires 58 when sensor body 48 of Doppler ultrasound transducer 42 is inserted into interior compartment 38. Open bottom 36 of transducer housing 30 is bounded by a bottom periphery 64 that serves as a contact surface 66 between transducer housing 12 and a skin surface upon which it is placed.

In some embodiments, exterior 60 of housing body 59 may be configured with features to aid the user in handling transducer fixation apparatus 10 and positioning it on extremity surface 18 of patient 12. For example, exterior 60 may be configured with surface ridges 70 to provide a textured region for a user to grasp with greater traction than that afforded by a non-textured surface. Similarly, exterior 60 may be configured with pinch grip features 72 to aid the user in the manipulation and positioning of transducer fixation apparatus 10. In some embodiments, transducer housing 30 may have a top 74 configured with a protruding feature such as a boss 76 in the form of a spine, ridge, button, or other shape to facilitate handling and placement of transducer fixation apparatus 10.

Figure 2A:
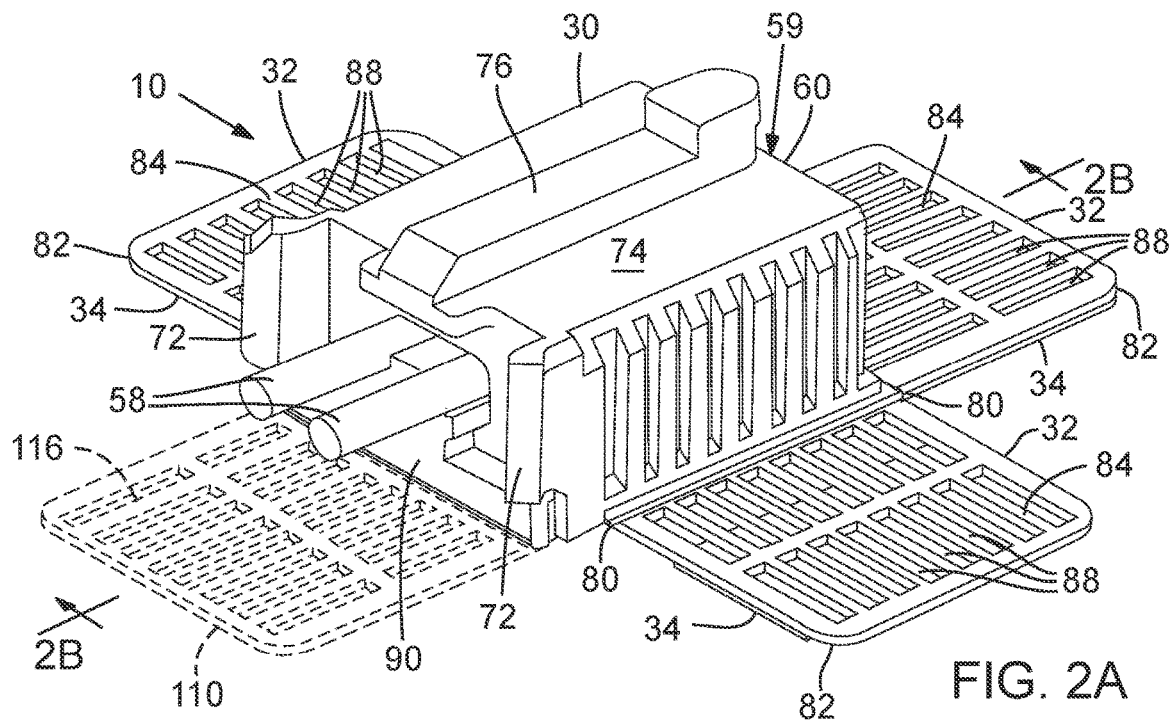
FIG. 2A is a rear isometric view of a first embodiment of the transducer fixation apparatus of FIG. 1.
Figure 2B:
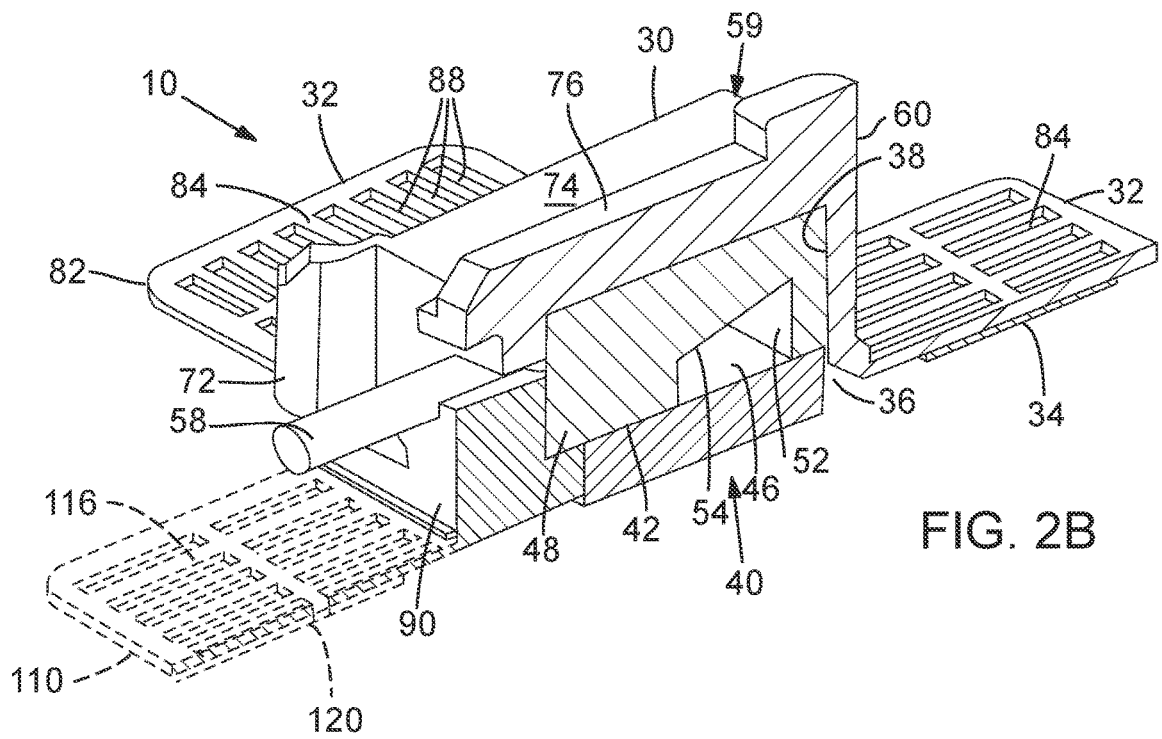
FIG. 2B is a sectional view taken along lines 2B-2B of FIG. 2A.

A plurality of flexible attachment wings 32 are formed on and extend outwardly from transducer housing 30 and provide a structural feature to secure transducer fixation apparatus 10 onto skin surface 18 of patient 12. Each of the plurality of flexible attachment wings 32 comprises a proximal end 80 and a distal end 82 and has an upper side 84 and a lower side 86. At proximal end 80, upper side 84 of each flexible attachment wing 32 is contiguous with exterior 60 of housing body 59 of transducer housing 30 and lower side 86 of each wing 32 is contiguous with contact surface 66 of open bottom 36. Each of lower sides 86 of the plurality of flexible attachment wings 32 is coated with layer of adhesive bonding material 34 suitable for securing the transducer housing 30 to skin surface 18 of patient 12. In some embodiments, each of the plurality of flexible attachment wings 32 may have material removed between its proximal 80 and distal ends 82 to impart a greater degree of structural flexibility, thereby allowing greater freedom to conform lower side 86 to curved surfaces. In FIG. 2A, for example, material has been removed to create a set of slots 88 extending from proximal end 80 to distal end 82 to enhance wing flexibility. In other embodiments, a similar effect may be achieved by removal of material in the shape of disks or other patterns to lower the bending stiffness of flexible attachment wings 32. In yet other embodiments, flexible attachment wings 32 may be configured to allow material to be trimmed away manually to decrease the footprint of transducer fixation apparatus 10 on the skin surface or accommodate patient-specific anatomic features or post-surgical wraps or bandages.

Figure 2C:
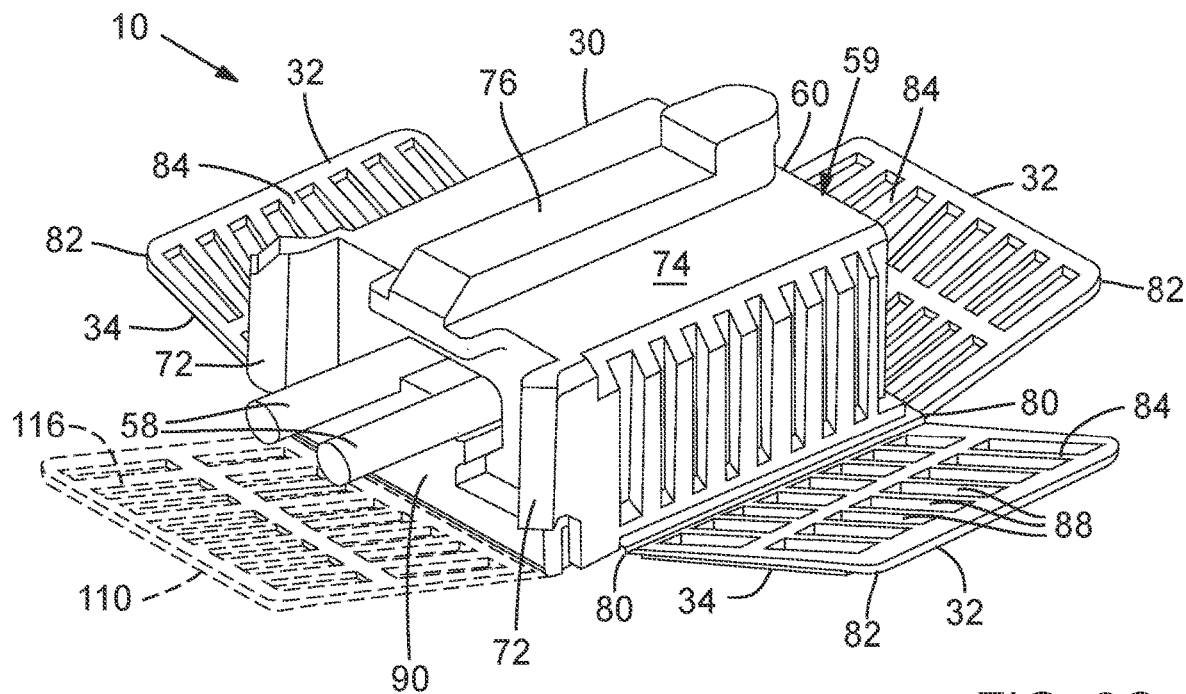
FIG. 2C is a rear isometric view of a second embodiment of the transducer fixation apparatus having straight biased wings.
Figure 2D:
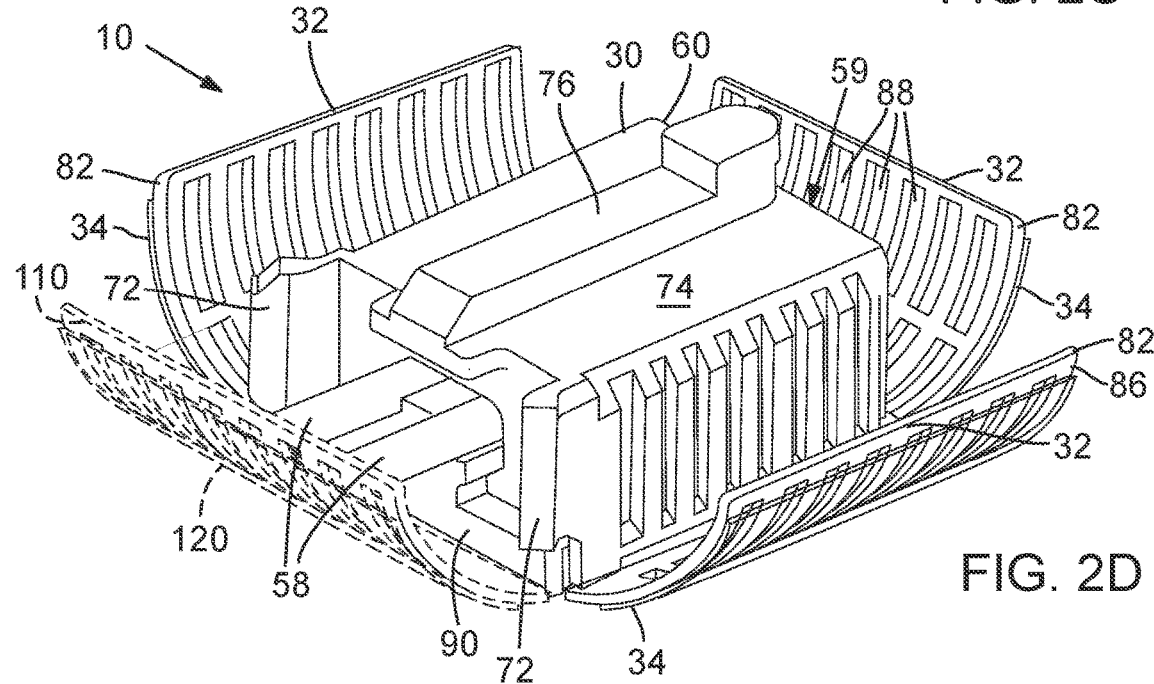
FIG. 2D is a rear isometric view of a third embodiment of the transducer fixation apparatus having curved biased wings.
Figure 3A:
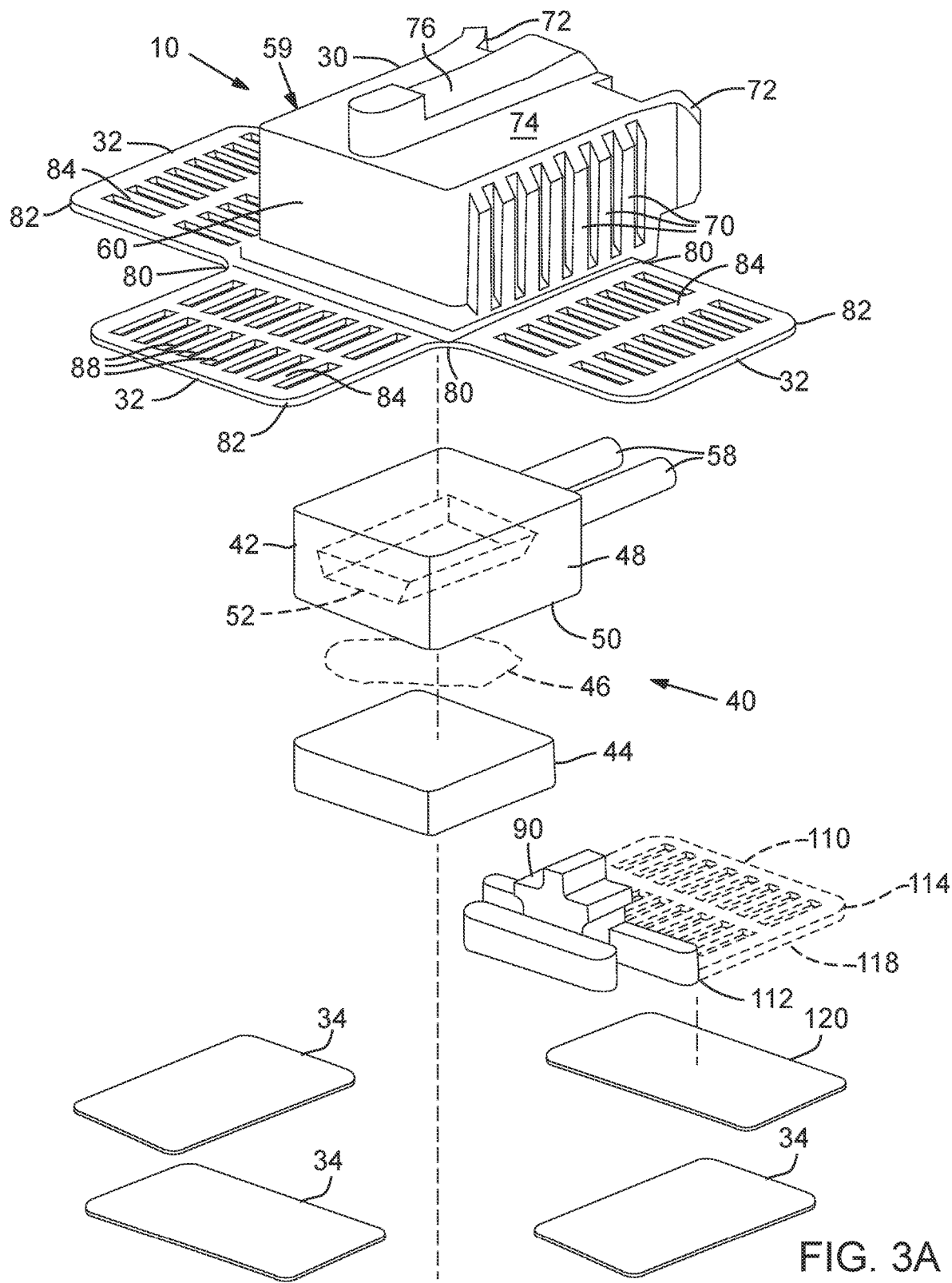
FIG. 3A is an exploded view shown from the rear of the transducer fixation apparatus of FIG. 2A.
Figure 3B:
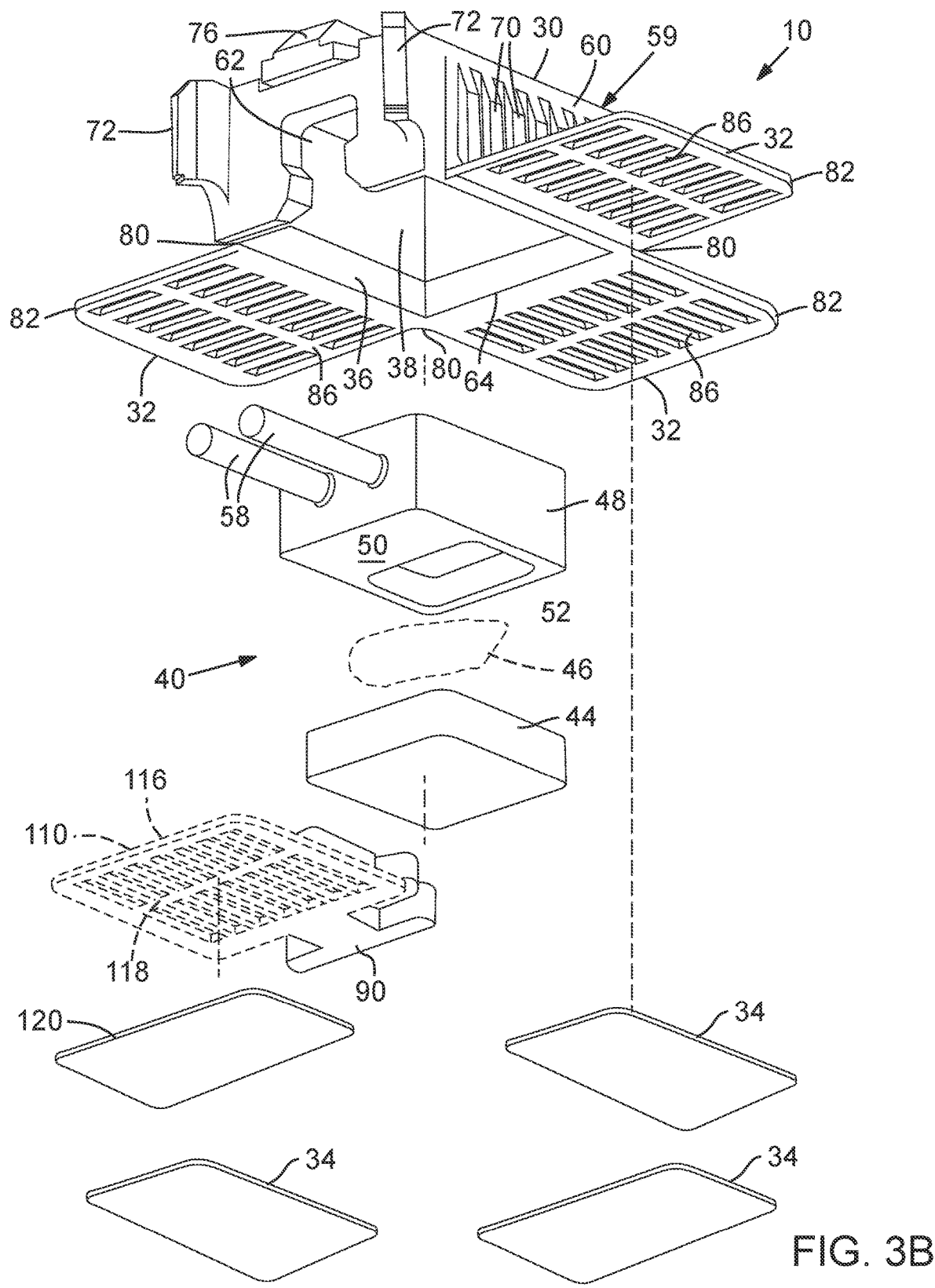
FIG. 3B is an exploded view shown from the front of the transducer fixation apparatus of FIG. 2A.

In particular embodiments shown in FIGS. 2C and 2D, flexible attachment wings 32 may be biased so that their lower sides 86 are elevated away from skin surface 18 when contact surface 68 of bottom periphery 64 is set upon surface 18. Such conformation of flexible attachment wings 32 affords advantages for positioning transducer fixation apparatus 10 on skin surface 18. For example, such conformation allows the user to easily reposition transducer fixation apparatus 10 while searching for an optimal location and orientation to maximize signal acquisition over a blood vessel of interest prior to attachment of layer of adhesive bonding material 34 to skin surface 18. In the embodiment of FIG. 2C, each of flexible attachment wings 32 is maintained in a planar conformation but extends outwardly from transducer housing 30 at acute angle relative to exterior 30 of housing body 59 to provide clearance between layer of adhesive bonding material 34 and skin surface 18. In the embodiment of FIG. 2D, each of flexible attachment wings 32b is formed in a continuously curved conformation to maintain clearance with skin surface 18 during positioning.

Figure 4:
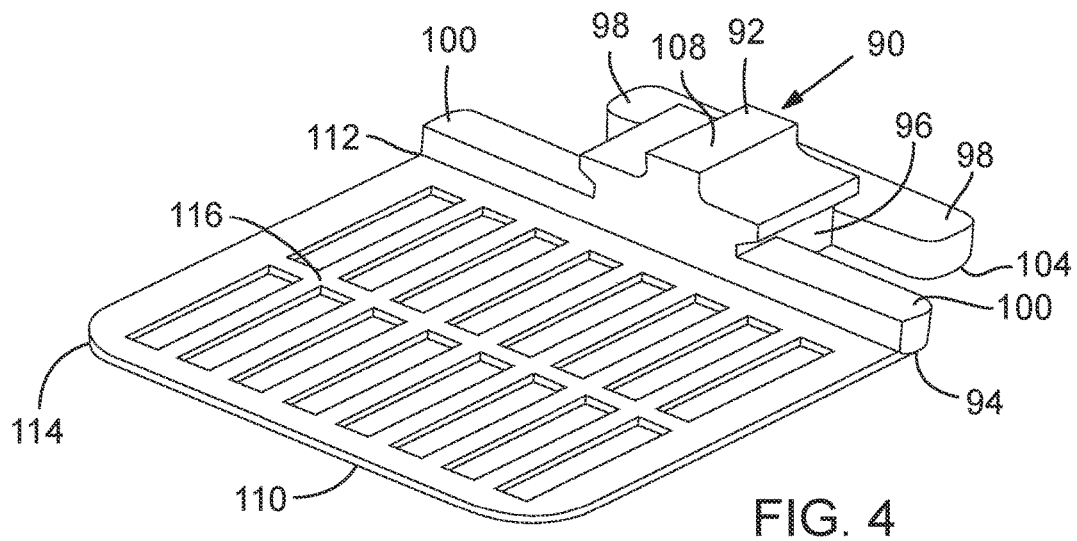
FIG. 4 is an isometric view of the winged insert of the transducer fixation apparatus of FIG. 2A.
Figure 5:
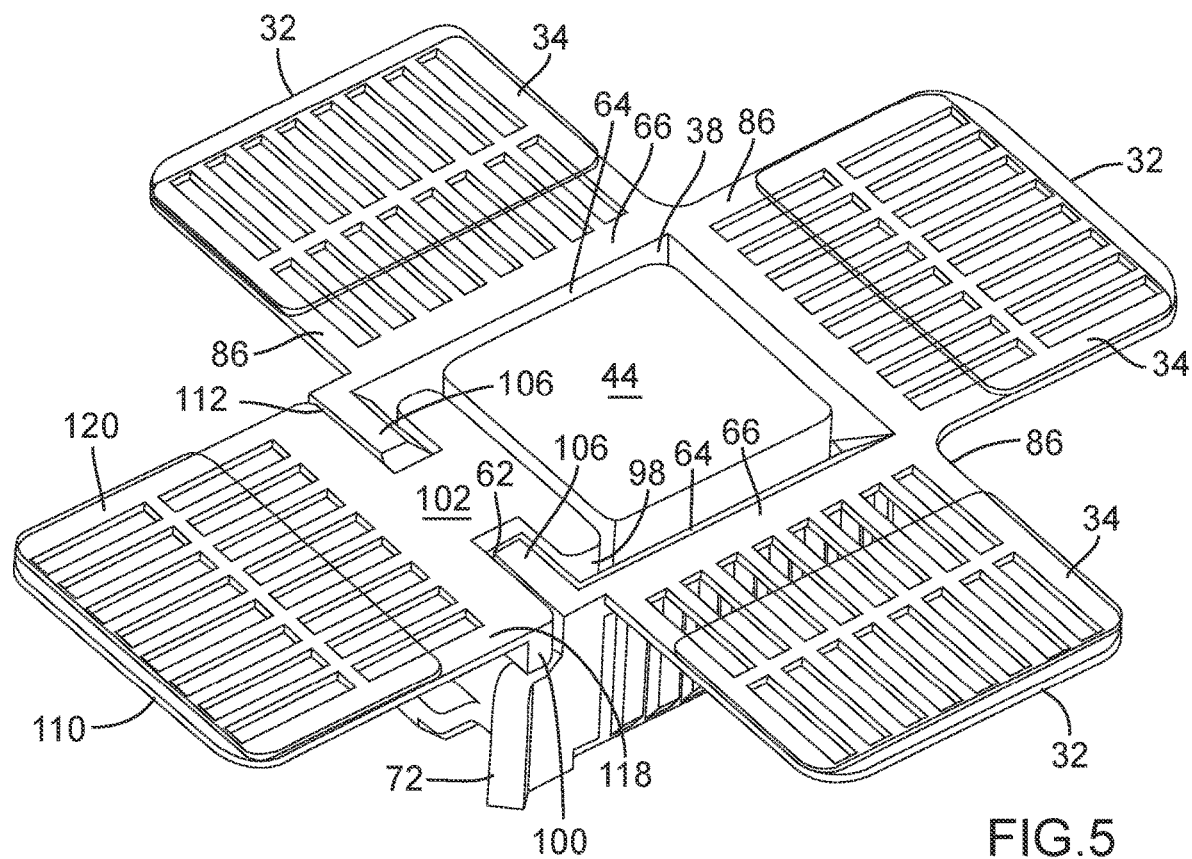
FIG. 5. is rear-side elevation view of the transducer fixation apparatus of FIG. 2A assembled with the winged insert of FIG. 4.
Figure 6:
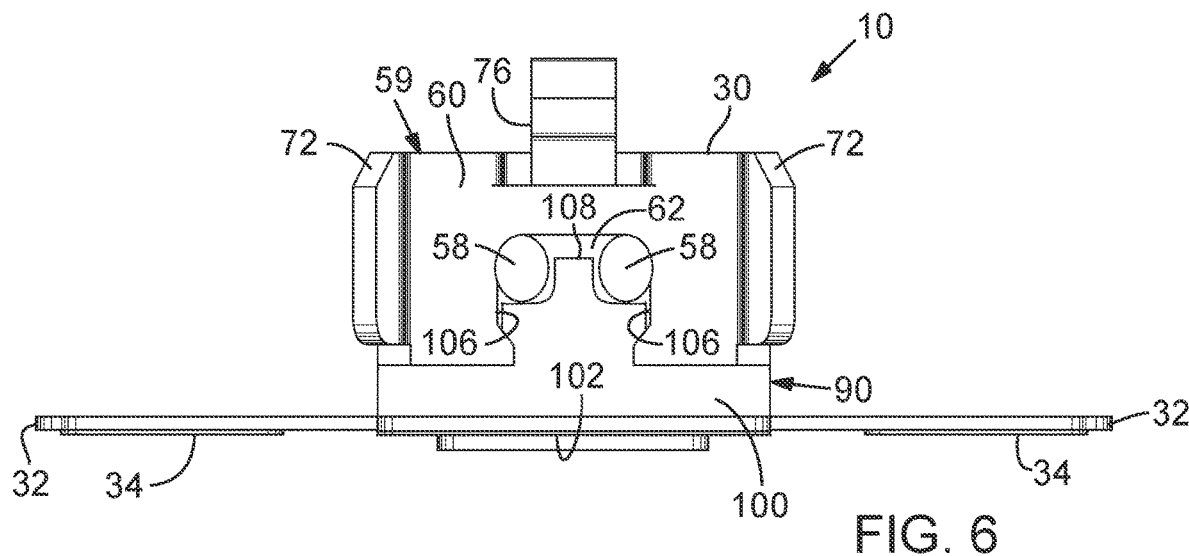
FIG. 6 is an isometric view of the underside of the transducer fixation apparatus of FIG. 2A.

FIGS. 2A, 2B, 3A, 3B, and 4 show that in some embodiments transducer fixation apparatus 10 may include an insert 90 with a superior end 92 and an inferior end 94 configured to slide into and partly obstruct side opening 62 of transducer housing 30 while forming a continuous closed perimeter where transducer housing 30 contacts the skin surface 18 of patient 12. FIGS. 4, 5, and 6 show an exemplary embodiment of insert 90 having a main body 96 with interior clip arms 98 and exterior clip arms 100. Insert 90 has an inferior surface 102 at inferior end 94 delineated by an inferior margin 104 surrounding main body 96, interior clip arms 98, and exterior clip arms 100. When main body 96 of insert 90 is slid into side opening 62, interior clip arms 98 and exterior clip arms 100 span and frictionally attach to the housing wall 106 separating interior compartment 38 from exterior 60. As shown in FIG. 5, in this assembled configuration, inferior surface 102 of insert 90 is coplanar with bottom periphery 64 of transducer housing 30 and serves to mitigate evaporative fluid loss from acoustic gel pad 44 and acoustic gel 46 that can occur when transducer fixation apparatus 10 is attached to skin of patient 12. Insert 90 also includes at superior end 92 of main body 96 a superior surface 108 configured to provide support for set of signal wires 58 exiting side opening 62. The profile of superior surface 108 may be shaped to accommodate the gauge and spacing of signal wires 58 as depicted in FIG. 6.

FIGS. 4 and 5 show that, in some embodiments, insert 90 may include an insert wing 110 formed on and extending outwardly from main body 96. Insert wing 90 is depicted with phantom lines in FIGS. 2A, 2B, 2C, 2D, 3A, and 3B, and in solid lines in FIGS. 4 and 5. Insert wing 110 comprises a proximal end 112 and a distal end 114 and has an upper side 116 and a lower side 118. At proximal end 112, upper side 116 of insert wing 110 is contiguous with main body 96 and exterior clip arms 100 of insert 90, and lower side 118 of insert wing 110 is contiguous with inferior surface 102 of insert 90. Lower side 118 of insert wing 110 is coated with a layer of adhesive bonding material 120 suitable for securing the insert wing 110 to extremity surface 18 of patient 12. As shown in FIG. 5, when main body 96 of insert 90 including formed insert wing 110 is slid into side opening 62, inferior surface 102 of insert 90 is coplanar with bottom periphery 64 of transducer housing 30 and lower side 118 of insert wing 110 is substantially coplanar with plurality of flexible attachment wings 32. In this embodiment, inclusion of insert wing 110 on insert 90 provides an additional surface attachment feature to augment those already provided by plurality of flexible wings 32 formed on transducer housing 30. In some embodiments, insert wing 110 may also be biased so that lower side 118 is elevated away from inferior surface 102, and, thus, away from skin surface 18 when inferior surface 102 is set upon skin surface 18.

Figure 7:
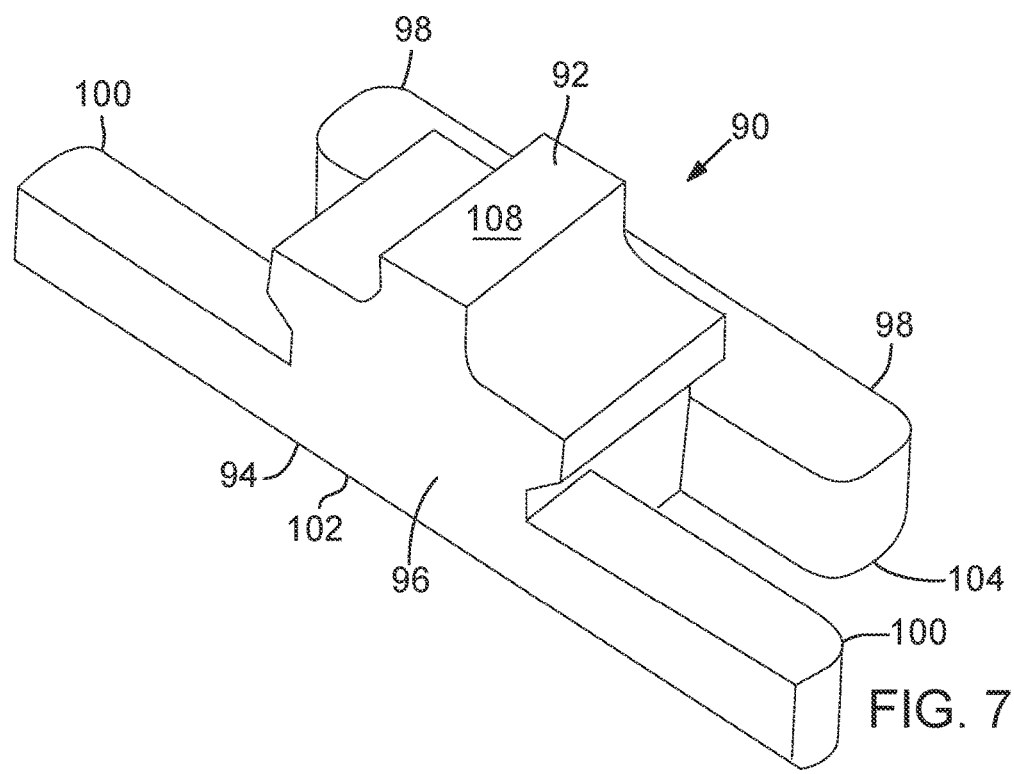
FIG. 7 is a isometric view of an embodiment of a wingless insert for the transducer fixation apparatus of FIG. 2A.
Figure 8A:
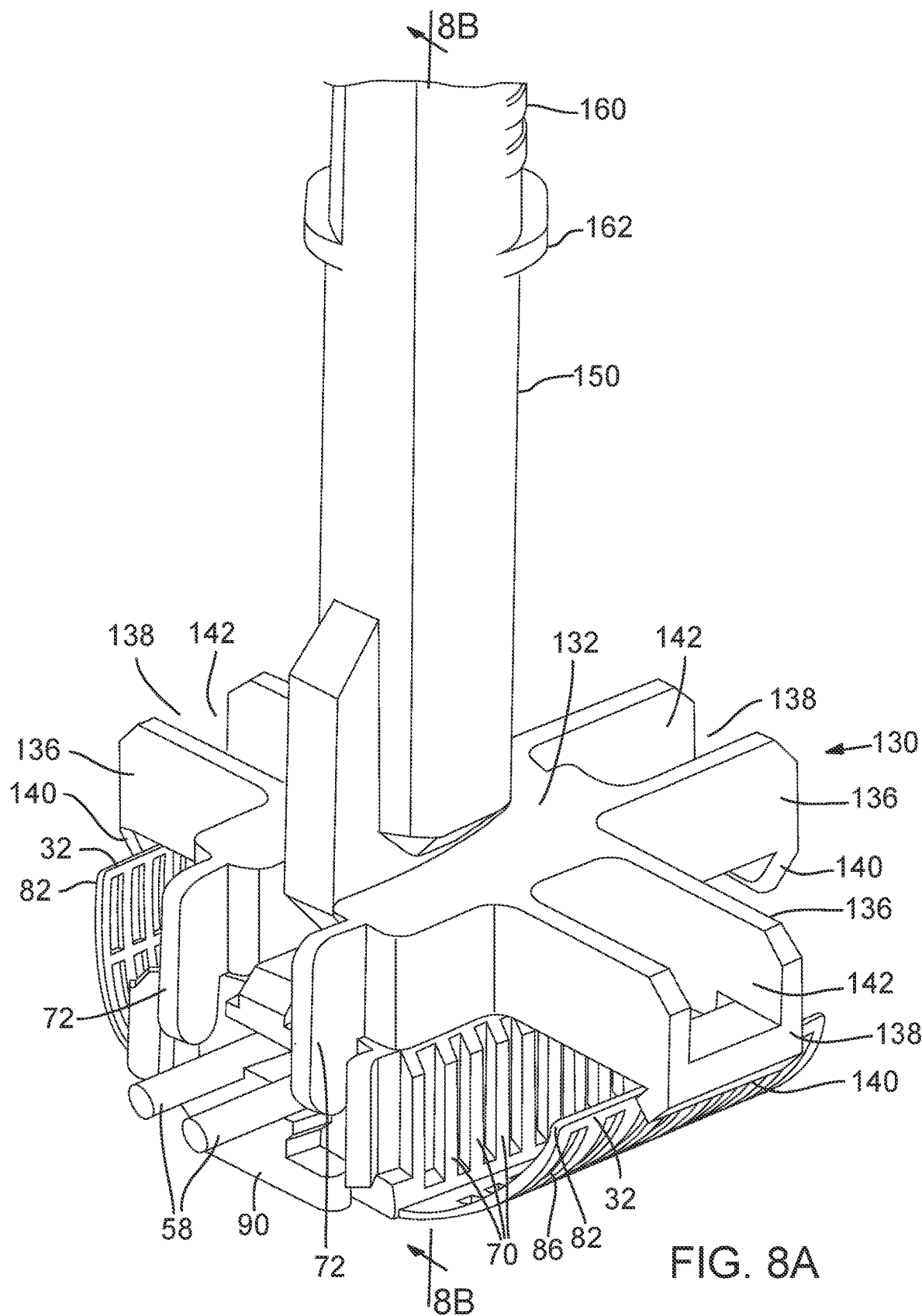
FIG. 8A is a rear isometric view of an embodiment of the disclosed transducer fixation apparatus shown with a fragmentary rendering of a positioning wand.
Figure 8B:
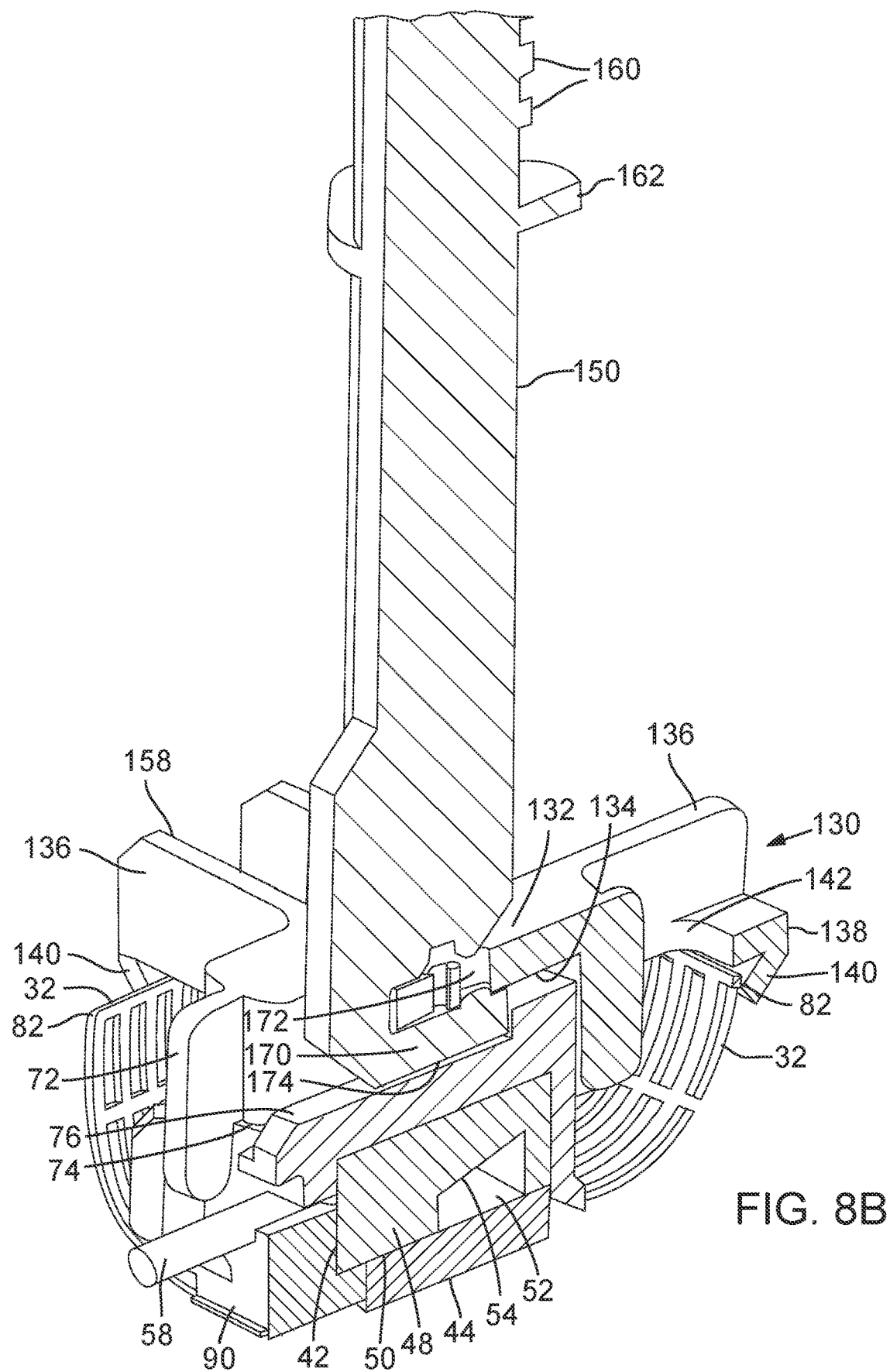
FIG. 8B is a sectional view taken along lines 8B-8B of FIG. 8A.

FIG. 7 shows that, in a further embodiment of insert 90, a wing structure may be absent. Such a wingless configuration of insert 90, also depicted in FIGS. 8A, 8B, 9A, and 9B, may be advantageous when space for surface attachment is limited, but it is still desirable to mitigate evaporative fluid loss from gel pad 44 and acoustic gel 46. Mounting constraints might arise, for example, due to presence of anatomic features, placement of surgical bandages or dressings, or proximity to areas of wound healing.

Turning now to FIGS. 8A, 8B, 9A, and 9B, in some embodiments, transducer fixation apparatus 10 may further include a retainer clip 130 configured for releasable attachment to top 74 of transducer housing 30. In such embodiments, when it is attached to top 74 of transducer housing 30, retainer clip 130 is designed to lift and hold each of flexible attachment wings 32 upwards and away from extremity surface 18 in a curved conformation. Maintaining flexible attachment wings 32 in such position aids in the positioning of transducer assembly 40 on patient 12 prior to adhesively securing flexible wings 32 to the skin. Retainer clip 130, in the embodiment depicted here, includes a central body 132 having a centrally-located depression 134 that is sized to be matable (for instance, by a friction fit) with boss 76 protruding from top 74 of transducer housing 30. Retainer clip 130 is formed with a plurality of support arms 136 (three depicted here) extending outwardly from central body 132. Each of the plurality of support arms has a distal end 138 at which a snap latch 140 is formed. Each snap latch 140 is positioned and configured to receive the distal end 82 of a corresponding, spatially aligned flexible attachment wing 32 and maintain it in a curved configuration with lower side 86 elevated away from the skin surface 18 of patient 12. Snap latches 140 are configured to release distal ends 82 of flexible attachment wings 32 as retainer clip 130 is lifted away from transducer housing 30, allowing flexible attachment wings 32 to return to their non-curved conformation. Each of support arms 136 may also include a see-through slot 142 formed along its length to aid the user with target visualization during placement of transducer housing 30 and transducer assembly 40.

Embodiments of transducer fixation apparatus 10 that utilize retainer clip 130 may also be configured with an optional positioning wand 150 to further facilitate placement of transducer assembly 40 at a location having a robust blood flow signal for continuous monitoring. FIGS. 8A, 8B, 9A, and 9B show embodiments of transducer fixation apparatus 10 incorporating positioning wand 150 having a free end 152, a midshaft 154 and an attachment end 156. A handle portion 158 near free end 152 of midshaft 156 includes a set of raised ridges 160 to impart surface traction and improve user grip and maneuverability of wand 150. A finger shelf 162 may also be provided in handle portion 158 to improve user ergonomic performance during manipulation of wand 150. Free end 152 may also include a signal wire retention feature 164 in the form of a notch configured to receive and hold in place the set of signal wires 58 from ultrasound transducer 42 during placement of transducer assembly 40 on patient extremity surface 18. Free end 152 may also include a clip or hole feature 168 to allow wand 150 to be attached to a lanyard, cable, strap, or other connection means as desired by the user.

Figure 9A:
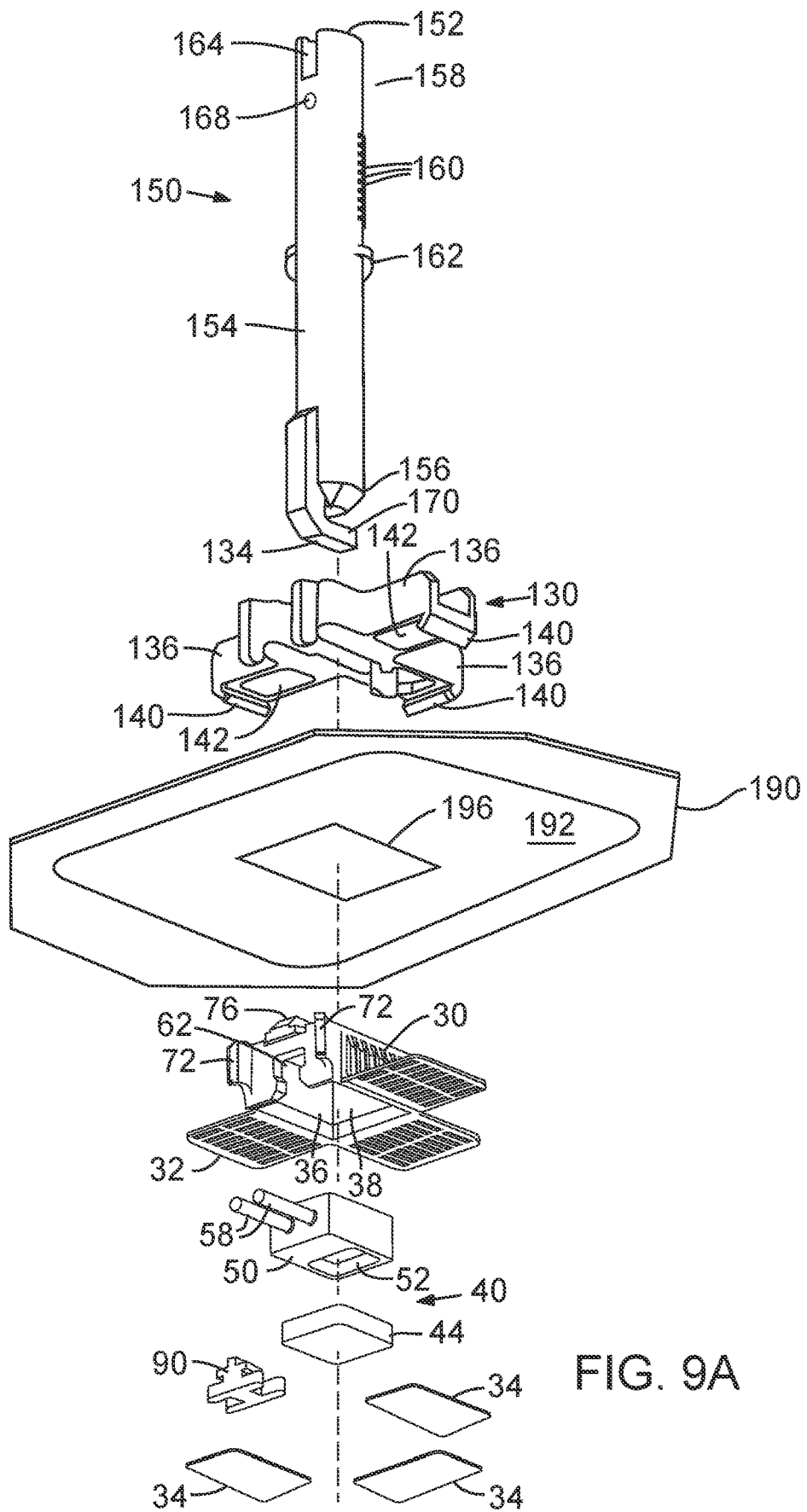
FIG. 9A is an exploded view taken from the rear of the transducer fixation apparatus of FIG. 8A and shown with the entire positioning wand.
Figure 9B:
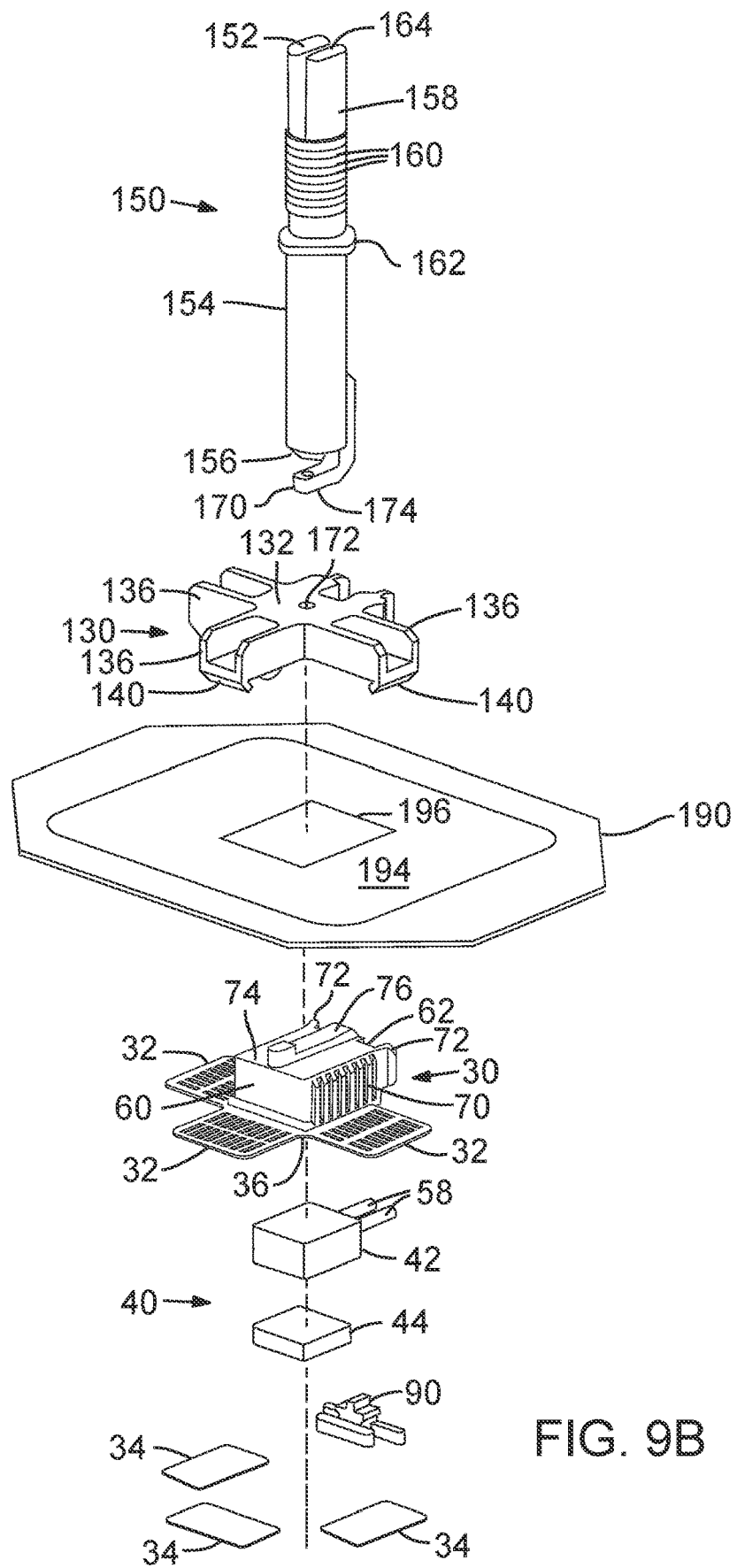
FIG. 9B is an exploded view taken from the front of the transducer fixation apparatus of FIG. 8A and shown with the entire positioning wand.
Figure 10:
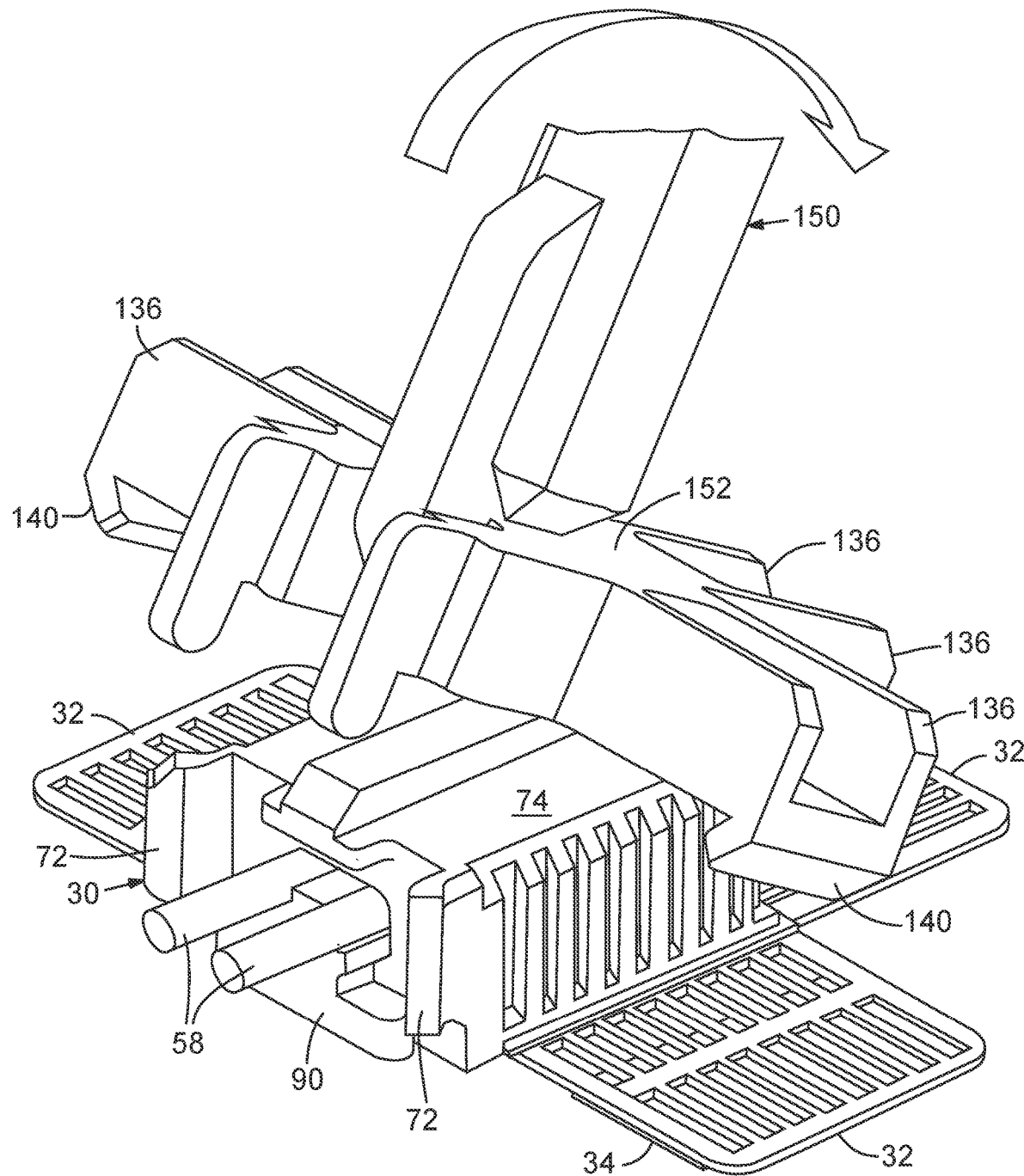
FIG. 10 is a rear isometric view of an embodiment of the disclosed transducer fixation apparatus with a retainer clip being removed by rotation of the positioning wand.

Attachment end 156 of positioning wand 150 may also be further configured for releasable attachment to retainer clip 130 while retainer clip 130 is attached to top 74 of transducer housing 30. In the embodiment shown in FIGS. 8A, 8B, 9A, and 9B, for example, attachment end 156 includes a snap hook 170 sized and configured for mechanical connection into a snap hook receptacle 172 formed in central body 132 of retainer clip 130. Snap hook receptacle 172 is formed in retainer clip 130 such that, when snap hook 170 and snap hook receptacle 172 are united, a bearing surface 174 forming part of snap hook 170 at attachment end 156 of wand 150 is placed in surface contact with boss 76 protruding from top 74 of transducer housing 30. The surface contact between bearing surface 174 and boss 76 serves as a fulcrum point to manipulate and detach the combined wand 150 and retainer clip 130 assembly from boss 76 of transducer housing 30. FIG. 10 shows an example of a combined wand 150 and retainer clip 130 assembly being rotated and detached from boss 76 on top 74 of transducer housing 30. Once detached from transducer housing 30, the combined wand 150 and retainer clip 130 assembly may be lifted away by the user to release flexible attachment wings 32 from snap latches 140 of retainer clip 130 so that they return to their non-curved conformation for adhesion to the patient's skin.

Figure 11:
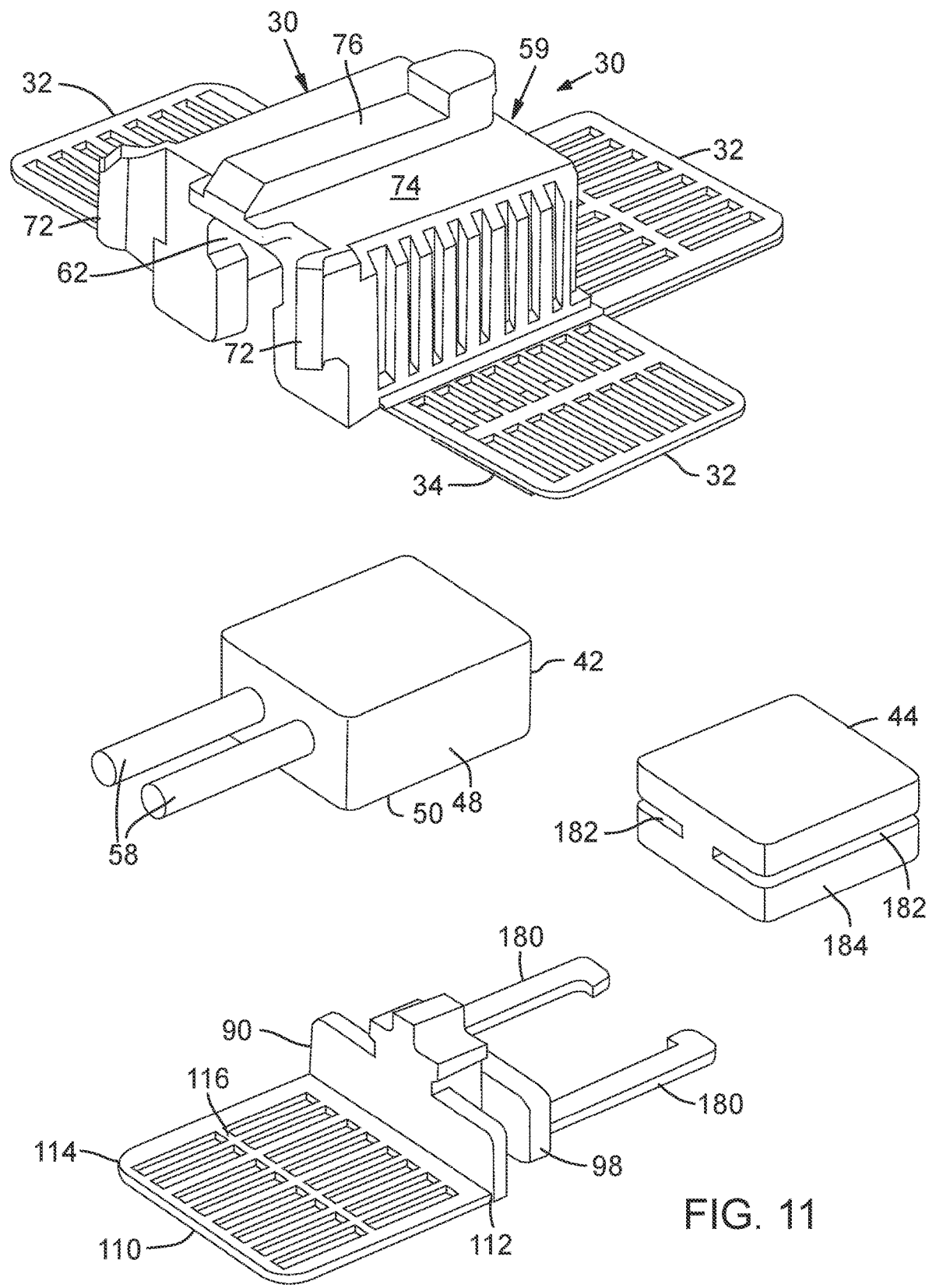
FIG. 11 is an exploded view of an embodiment of the transducer fixation apparatus with a winged insert configured with retention arms to hold a gel pad.
Figure 12:
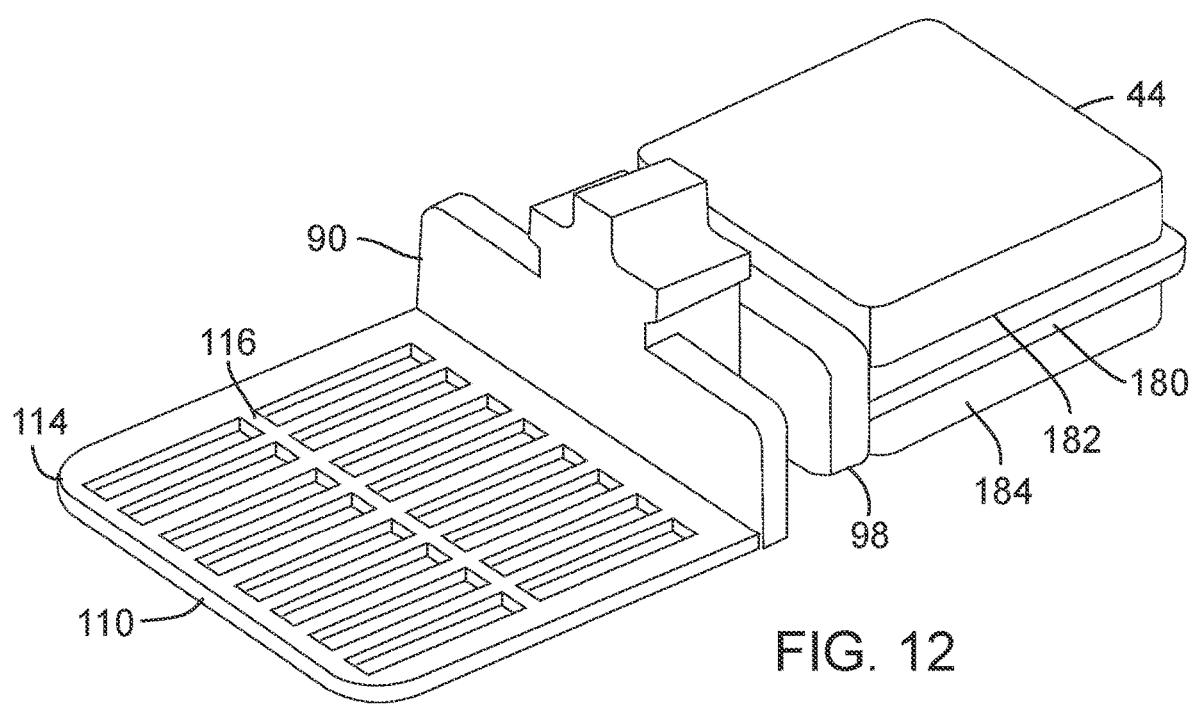
FIG. 12 is an isometric view of an assembly of the winged insert configured with retention arms and the gel pad of the transducer fixation apparatus of FIG. 11.

In some embodiments, it may be desirable to configure gel pad 44 and insert 90 as an assembly that can be packaged in an air-tight container separately from transducer housing 30. Such separate packaging ensures that, during storage, gel pad 44 retains moisture without degrading adhesive bonding material 34 on lower side 86 of flexible attachment wings 32 of housing 30, as might occur if components were packaged together. FIGS. 11 and 12 show an alternative embodiment of winged insert 90 that includes a pair of gel pad retention arms 180 extending outwardly from interior clip arms 98 and sized to retain gel pad 44 stationary between them. In such embodiments, gel pad 44 may be fashioned or modified to include slots 182 extending along its lateral sides 184 into which retention arms 180 may be interdigitated to join insert 90 and gel pad 44 as an assembly. When assembled and packaged in this manner, this embodiment also obviates the need for the clinician to physically handle gel pad 44 or directly affix it to mounting-side surface 50 of Doppler ultrasound transducer 42 during deployment on skin surface 18 of patient 12. Instead, when the assembly of winged insert 90 and gel pad 44 is slid into opening 62 of transducer housing 30, gel pad 44 is positioned to span open bottom 36 with top surface 186 placed in mechanical communication with mounting-side surface 50 to provide acoustic coupling between skin surface 18 and Doppler ultrasound transducer 42.

In some embodiments, transducer fixation apparatus 10 may be further secured to skin surface 18 of patient 12 using an adhesive bandage 190 placed over the upper sides 84 of flexible attachment wings 32. An example of such an adhesive bandage 190 having an adhesive side 192 and a non-adhesive side 194 is depicted in FIGS. 9A and 9B. Adhesive bandage 190 may be configured with a central cutout 196 sized to slide over and around exterior 60 of housing body 59 of transducer housing 30 so that adhesive side 192 rests upon upper sides 84 of flexible attachment wings 32 and extends outwardly beyond distal ends 82. In some embodiments, adhesive bandage 190 may comprise a waterproof sterile barrier material such as the transparent film dressing sold under the trademark "Tegaderm."

It will be obvious to those having skill in the art that many changes may be made to the details of the above-described embodiments without departing from the underlying principles of the invention. The scope of the present invention should, therefore, be determined only by the following claims.

The invention claimed is:

1. A transducer housing configured to position and secure an ultrasound transducer onto a skin surface of a patient, the transducer housing comprising:

a housing body having an exterior and formed with an interior compartment that is accessible through an open bottom, the open bottom bounded by a bottom periphery and the interior compartment configured to receive and constrain from motion the ultrasound transducer;

a side opening from the exterior of the housing body to the interior compartment, the side opening formed in the housing body such that it is contiguous with the open bottom and configured to allow a set of signal wires in operable communication with the ultrasound transducer to exit the interior compartment;

an insert configured to slide into and partly obstruct the side opening in the housing body of the transducer housing, the insert having a main body with a superior surface configured to provide support for the set of signal wires exiting the side opening, and an inferior surface which, when the main body of the insert is positioned in the side opening, is coplanar with the bottom periphery of the open bottom of the transducer housing; and a plurality of wings formed on and extending outwardly from the exterior of the housing body, each of the plurality of wings having a proximal end and a lower side, the proximal ends set contiguous with the exterior of the housing body at the open bottom, and the lower sides each coated with a layer of adhesive bonding material suitable for securing the transducer housing to the skin surface of the patient such that the bottom periphery is in contact with said skin surface.

2. The transducer housing of claim 1, further comprising an acoustic coupling material configured to span the open bottom of the housing body and maintain mechanical communication between the ultrasound transducer immobilized within the interior compartment and the skin surface to which the transducer housing is secured.

3. The transducer housing of claim 2, in which the acoustic coupling material comprises an acoustic gel pad.

4. The transducer housing of claim 3, in which the acoustic coupling material further comprises a volume of acoustic gel.

5. The transducer housing of claim 1, in which the insert further comprises an insert wing formed on and extending outwardly from the main body, the insert wing having a proximal end and a lower side, the proximal end set contiguous with the main body at the inferior surface of the insert, and the lower side coated with a layer of adhesive bonding material suitable for securing the insert wing to the skin surface of the patient.

6. The transducer housing of claim 5, in which the insert further comprises a pair of retention arms extending in parallel from the main body opposite the insert wing and configured to retain between them a gel pad sized to span the open bottom of the transducer housing.

7. The transducer housing of claim 6, in which the gel pad has lateral sides and a top surface, the lateral sides configured with slots into which the pair of retention arms fit to retain the top surface of the gel pad against the ultrasound transducer when the insert is positioned in the side opening.

8. The transducer housing of claim 1, in which the insert further comprises a pair of retention arms extending in parallel from the main body and configured to retain between them a gel pad sized to span the open bottom of the transducer housing.

9. The transducer housing of claim 8, in which the gel pad has lateral sides and a top surface, the lateral sides configured with slots into which the pair of retention arms fit to retain the top surface of the gel pad against the ultrasound transducer when the insert is positioned in the side opening.

10. The transducer housing of claim 1, in which the plurality of wings are biased so that their lower sides are elevated away from the skin surface of the patient when the bottom periphery of the transducer housing is set upon the skin surface.

11. The transducer housing of claim 1, in which the plurality of wings are biased so that their lower sides are elevated away from the skin surface of the patient when the bottom periphery of the transducer housing is set upon the skin surface.

12. The transducer housing of claim 5, in which the plurality of wings and the insert wing are biased so that their lower sides are elevated away from the skin surface of the patient when the insert is positioned in the side opening and the bottom periphery of the transducer housing is set upon the skin surface.

13. The transducer housing of claim 6, in which the plurality of wings and the insert wing are biased so that their lower sides are elevated away from the skin surface of the patient when the insert is positioned in the side opening and the bottom periphery of the transducer housing is set upon the skin surface.

14. A transducer fixation apparatus to enable repeated measurement of subsurface blood flow at a fixed location on a skin surface of a patient, comprising:
an ultrasound transducer configured to emit first ultrasound signals for incidence on the skin surface of the patient and to receive second ultrasound signals returned after incidence of the first ultrasound signals on the skin surface;
an acoustic coupling material forming an interface between the ultrasound transducer and the skin surface;
a transducer housing having an exterior and an open bottom bounded by a bottom periphery, the transducer housing formed with an interior compartment that is accessible through the open bottom, and the interior compartment configured to receive and constrain from motion the ultrasound transducer when it is placed within the interior compartment;
a side opening from the exterior to the interior compartment of the transducer housing, the side opening formed such that it is contiguous with the open bottom of the transducer housing;
an insert comprising a main body configured to slide into and partly obstruct the side opening in the transducer housing and an inferior surface which, when the main body of the insert is positioned in the side opening, is coplanar with the bottom periphery of the open bottom of the transducer housing; and
a plurality of wings formed on and extending outwardly from the exterior of the transducer housing, each of the plurality of wings having a proximal end and a lower side, the proximal ends each set contiguous with the exterior of the transducer housing at the open bottom, and the lower sides each coated with a layer of adhesive bonding material suitable for securing the transducer housing to the skin surface of the patient so that the ultrasound transducer is immobilized within the interior compartment and oriented to enable the first and second ultrasound signals to propagate to and from the skin surface through the open bottom of the transducer housing to measure subsurface blood flow.

15. The transducer fixation apparatus of claim 14, further comprising a set of signal wires extending from the transducer, and in which the transducer housing includes from its exterior to its interior compartment a side opening that is sized to allow the set of signal wires to pass through and exit the transducer housing.

16. The transducer fixation apparatus of claim 14, in which the acoustic coupling material comprises an acoustic gel pad.

17. The transducer fixation apparatus of claim 16, in which the acoustic coupling material further comprises a volume of acoustic gel.

18. The transducer fixation apparatus of claim 14, further comprising a set of signal wires extending from the ultrasound transducer and passing through and exiting the side opening, and in which the insert has a superior surface configured to provide support for the set of signal wires exiting the side opening.

19. The transducer fixation apparatus of claim 14, in which the insert further comprises an insert wing formed on and extending outwardly from the main body, the insert wing having a proximal end and a lower side, the proximal end set contiguous with the main body at the inferior surface of the insert, and the lower side coated with a layer of adhesive bonding material suitable for securing the insert wing to the skin surface of the patient.

20. The transducer fixation apparatus of claim 19, in which the insert further comprises a pair of spaced-apart, parallel aligned retention arms extending from the main body and configured to retain an acoustic gel pad positioned between them.

21. The transducer fixation apparatus of claim 20, in which the acoustic gel pad has lateral sides and a top surface, the lateral sides configured with slots into which the pair of retention arms fit to retain the top surface of the gel pad against the ultrasound transducer when the insert is positioned in the side opening.

22. The transducer fixation apparatus of claim 14, in which the open bottom of the transducer housing has a bottom periphery, and in which the plurality of wings are biased so that their lower sides are elevated away from the skin surface of the patient when the bottom periphery of the transducer housing is set upon the skin surface.

23. The transducer fixation apparatus of claim 19, in which in which the plurality of wings and the insert wing are biased so that their lower sides are elevated away from the skin surface of the patient when the insert is positioned in the side opening and the bottom periphery of the transducer housing is set upon the skin surface.

24. The transducer fixation apparatus of claim 20, in which in which the plurality of wings and the insert wing are biased so that their lower sides are elevated away from the skin surface of the patient when the insert is positioned in the side opening and the bottom periphery of the transducer housing is set upon the skin surface.

25. The transducer fixation apparatus of claim 14, in which the exterior of the housing body includes a substantially planar top from which a boss protrudes, and further comprising:
a retainer clip configured for removable placement on the substantially planar top of the housing body, the retainer clip having a central body with a depression matable with the boss on the top of the housing body; and
a plurality of support arms extending outwardly from the central body, each of the plurality of support arms having a distal end at which a snap latch is positioned to receive a distal end of a spatially aligned one of the plurality of wings of the transducer housing such that the wing is maintained in a curved configuration with the lower side elevated away from the skin surface of the patient.

26. The transducer fixation apparatus of claim 25, further comprising a wand having a free end configured to be held by a user and an attachment end configured for releasable attachment to the central body of the retainer clip such that, when the retainer clip is in place on the top of the transducer housing with the wand attached, a bearing surface at the attachment end of the wand is in surface contact with the boss and serves as a fulcrum for the wand as the user manipulates it to release the wings from the snap latches and lifts the retainer clip away from the transducer housing.

* * * * *